United States Patent Office 3,808,137
Patented Apr. 30, 1974

---

3,808,137
PROCESS FOR PRODUCTION OF A CARBOXYL-METHYL STARCH SUITABLE PARTICULARLY FOR USE IN DETERGENTS
Franz Baumann, Stolberg-Busbach, Friedrich Bayerlein, Krailling, Peter-Paul Habereder, Munich, and Helmut Stache, Marl, Germany, assignors to Diamalt Aktiengesellschaft, Munich, Germany
No Drawing. Filed Apr. 18, 1972, Ser. No. 245,280
Claims priority, application Germany, Apr. 19, 1971, P 21 18 902.6
Int. Cl. C11d 1/02
U.S. Cl. 252—89                                4 Claims

ABSTRACT OF THE DISCLOSURE

Carboxymethyl starch suitable as a soil suspending agent in detergent compositions is produced by reacting the starch with an alkali and an alkali salt of chloroacetic acid in a substantially water-free alcoholic medium.

BACKGROUND

(a) Field of the invention

The invention relates to a process for the production of a carboxymethyl starch particularly suitable for use in detergents. The invention also relates to the utilization of such carboxymethyl starch in detergents and to detergents comprising such carboxymethyl starch.

(b) Prior art

Modern detergents substantially consist of entirely synthetic active detergents, so-called syndets (synthetic detergents), and conventional builders, and they comprise only a small amount of soap or no soap at all. however, contrary to soaps, the syndets do not have any soil suspending power of their own. By soil suspending power is understood the necessary capability of any washing agent to hold soil particles afloat or in supension, respectively, and to prevent them from contacting, and being attached again to the already washed filament. As a result of the above, all detergents based on syndets comprise soil suspending agents, and, in particular, carboxymethyl cellulose.

An assumption which might seem obvious to one who is not skilled in the art is that the corresponding derivatives of starch will have properties similar to those of the cellulose derivatives, which are suitable for use as soil suspension agents. However, this is incorrect. It has already been pointed out in the standard text of Kurt Lindner "Tenside, Textilhilfsmittel, Washrohstoffe" (surface active agents, auxiliary textile agents, raw washing agents), volume I (second edition 1964), page 308 that, in addition to the cellulose glycolates, also starch glycolates have found an increased technical utilization; however, contrary to the alkali salts of the carboxymethyl cellulose, they do not show any soil suspension power, so that their application in the detergent industry has been virtually insignificant. This appropriate statement of Lindner is not even controverted by the fact that, for example, in German Pat. 723,737, there have been used in detergents starches, which comprise ether-like bound hydrocarbon residues, which have been substituted by hydrophilic groups as, for example, oxyethyl starch or sodium starch glycolate. Experiments of Compton and Hart (Industrial and Engineering Chemistry, 1953, 597/598) have confirmed that the soil suspending power of carboxymethyl starch is exceedingly small; namely, for the measuring method used, it amounts to approximately 6% was compared to approximately 50% for carboxymethyl cellulose. This important difference is attributed by the authors to the basic difference between cellulose and starch.

Applicants' own experiments have confirmed these known findings, and they have shown that a conventional carboxymethyl starch, which may be produced, for instance, in accordance with the method of Swiss Pat. 276,-408, has practically no soil suspension power. This appears during washing tests as a substantial drop in the degree of brightness.

SUMMARY OF THE INVENTION

Surprisingly, it has been discovered that a carboxymethyl starch can be obtained by a process according to the invention, which has excellent soil suspension power and which, consequently can be used to advantage in detergents instead of carboxymethyl cellulose.

According to common practice, carboxymethyl starch is manufactured in such a manner that starch is dissolved in an excess of aqueous alkali, and the solution is reacted with the sodium salt of monochloracetic acid. According to the Swiss Pat. 276,408, it is already known to conduct this reaction in a limited amount of water, which amounts to six times the amount of starch at most, and to heat the reaction mixture in a rotating cylinder at a temperature higher than 100° C. In the course of this operation, the starch becomes pasty and glue-like. According to German Pat. 861,241 the conventional reaction of starch with aqueous alkali and chloroacetic acid is conducted also with a reduced amount of fluid, using small amounts of concentrated alkali lye in the presence of oils, fats, high molecular fatty acids or soaps.

The reaction of starch with an alkali and an alkaline salt of chloroacetic acid is effected according to the present invention in such a manner that the reaction takes place in a substantially water-free, alcoholic medium. The reaction mixture contains less than 20% water, preferably 5 to 15% water, and it preferably consists of methanol. Advantageously, the reaction is conducted in the absence of atmospheric oxygen, preferably at a temperature between 60 and 100° C., and especially between 80 and 90° C.

The process according to the invention is preferably accomplished in a mixing device, with such an amount of the alcoholic medium added that the powder-like character of the reaction mixture remains preserved over the entire duration of the reaction. In addition, it is also desired that the original grain structure of starch remains virtually intact.

According to a preferred embodiment of the process according to the invention, the powder-like starch is reacted in a mixing device with alkali and with the alkali salt of chloroacetic acid in the presence of the alcoholic, preferably methanolic reaction medium, and after the termination of the mixing operation, the mixing is evacuated while the mixing process is continued further, and the contents are heated to the reaction temperature, so that the alcohol evaporates during the reaction and the product of the reaction is obtained in a dry, pulverized form.

The carboxymethylation according to the invention is preferably conducted to a substitution degree between 0.05 to 0.5 and preferably 0.05 to 0.2. The carboxymethyl starch manufactured in accordance with the process according to the invention is consequently provided with a substantially lower degree of substitution than the commonly produced carboxymethyl starches manufactured in accordance with the conventional processes; for instance, the carboxymethyl starches produced in accordance with the process of the afore-mentioned Swiss Pat. 276,408 are provided with substitution degrees substantially in the range between 0.3 and 0.6.

It is surprising that starch derivatives having such a low degree of substitution have such good soil suspension power, mainly in view of the fact that the carboxymethyl cellulose used for this purpose has degrees of substitution substantially ranging from 0.6 to 0.8.

As a result of this low degree of substitution, the carboxymethyl starches according to the invention can be produced with great technical advantages and rather inexpensively, since only relatively minute amounts of chloroacetic acid and other chemical substances are needed for their preparation, and the process can be accomplished in just one production step, as a so-called one-container process in industrial equipment. All conventional mixing devices are suitable for use as mixing units, provided they are hermetically closeable and accomplish an intense mixing process of the ingredients. The process may be conducted under pressure, or also under vacuum. The reaction conditions are chosen so as to avoid swelling of the starch.

The carboxymethyl starch according to the invention is added to detergents of conventional composition to serve as a soil suspension agent, in amounts between 0.5 to 5% by weight. However, the starch can also be added in a larger amount, as it has been discovered that it can even replace a part of the conventional builder. In this manner, the carboxymethyl starch according to the invention can replace up to 50% of the phosphate content in detergents of conventional composition, for instance, of the tripolyphosphate. The decrease of the phosphate percentage resulting from this substitution is very important, mainly in view of the increasing eutrophication and contamination of water streams.

A substantial advantage of the utilization of the carboxymethyl starch according to the invention rather than of carboxymethyl cellulose is further seen in the substantially better and faster biodegradability of the starch derivative. The increasing contamination of the water stream not only requires reexamination of the active washing agents in view of this criterion, but it also requires bearing in mind this criterion when examining the other ingredients of the detergents. Now, the carboxymethyl starch can be biodegraded, for instance, in a water treatment plant, in the course of just a few hours.

DESCRIPTION OF PREFERRED EMBODIMENTS

The invention will be explained in greater detail with reference to the following examples.

EXAMPLE 1

33.0 kg. of corn starch (water content 10%) are placed in a suitable mixing device and reacted under steady mixing conditions in the mixing device with a solution of 2.2 kg. of caustic soda in 10.0 liters of methanol (90%) for a period of 20 minutes. Subsequently, 6.0 kg. of sodium monochloroacetate are added to the mixture with thorough mixing. The mixing unit is now closed and evacuated. The contents are then slowly heated to a temperature between 80 and 90° C. and the temperature is held constant for approximately 3½ hours. Then, the mixing device is cooled and the product discharged.

EXAMPLE 2

33.0 kg. of potato starch (water content 12%) are placed in a suitable mixing device and reacted under steady mixing conditions in the mixing device with a solution of 2.2 kg. of caustic soda in 12.0 liters of methanol (90%) for a period of 20 minutes. Subsequently, 6.0 kg. of sodium monochloroacetate are added to the mixture with thorough mixing. The mixing unit is now closed and evacuated. The contents are then slowly heated to a temperature between 80 and 90° C. and the temperature is held constant for approximately 3½ hours. Afterwards, the mixing device is cooled and the product discharged.

EXAMPLE 3

Production of a washing agent for test purposes

A washing agent having the following composition was prepared for test purposes in order to conduct comparison tests of the soil suspension power of CMS and CMC:

18.0% of active washing substances (mostly alkylbenzenesulfonate)
1.5% of a "soil suspension agent"
5.0% of water glass (100%)
1.5% of magnesia silicate
40.0% of $Na_5P_3O_{10}$
13.8% of $Na_2SO_4$
20.0% of sodium perborate-4-hydrate
0.2% of optical brighteners As soil suspension agents there were used in washing preparation A—conventional CMC, in the preparation B—conventional CMS, in the preparation C—CMS according to the invention.

Test of the activity

The three washing agents A, B and C were examined as regards their effect on cotton fabric. In order to achieve comparative random values, the fabric was washed 20 times in each of the respective washing agents. The corresponding soiling washes were conducted as follows:

The cotton fabric to be tested was sewed together with the soiled side of a standard soiled fabric, as is distributed by the washing establishments research institutes, then washed, rinsed, and, finally, the soiled fabric was separated and the test fabric dried. In each of the 20 washing operations, the soiled fabric was changed, but not the test fabric. The following conditions were chosen for the individual washing operations:

Concentration of the washing agent. 2 g./l.
Washing solution ratio, (weight fabric:weight washing liquor). 1:50.
Washing procedure --- 20 minutes at 90° C. The fabric was moved every 2 minutes in the washing liquor for 15 seconds.
Rinse --- 5 minutes under running water (cold).
Drying --- At 60° C. in a drier.

Result of the washing tests—measurements of brightness

The activity of the soil suspension agent was determined according to measurements of the degree of brightness after 20 washing cycles. A conventional measuring instrument was used for recording the measured values. In order to eliminate faulty measurements resulting from the backing used, the backings were white and black standard backings. Each sample was measured four times.

(a) UNTREATED COTTON FABRIC

Degree of brightness

| White backing standard 737 | | Black backing standard 755 | |
|---|---|---|---|
| 86.7 | 86.6 | 80.8 | 80.9 |
| 86.5 | 86.6 | 80.6 | 80.9 |

(b) COTTON FABRIC WASHED

| Washed with— | Degree of brightness | | | |
|---|---|---|---|---|
| | White backing standard 737 | | Black backing standard 755 | |
| A—(CMC) | 86.8 | 86.7 | 81.8 | 81.8 |
| | 86.7 | 86.7 | 81.3 | 81.5 |
| B—(Conventional CMS) | 79.5 | 78.9 | 77.6 | 77.4 |
| | 78.5 | 78.0 | 76.0 | 76.2 |
| C—(CMS according to the invention) | 86.8 | 87.1 | 81.6 | 81.8 |
| | 87.1 | 87.2 | 81.9 | 82.1 |

(c) COTTON FABRIC AND SOILED FABRIC WASHED

| A—(CMC) | 80.7 | 80.2 | 78.2 | 77.2 |
|---|---|---|---|---|
| | 80.4 | 80.1 | 76.7 | 76.4 |
| B—(Conventional CMS) | 79.5 | 78.9 | 77.6 | 77.4 |
| | 78.5 | 78.0 | 76.0 | 76.2 |
| C—(CMS according to the invention) | 81.8 | 82.0 | 77.8 | 78.8 |
| | 81.1 | 82.0 | 78.0 | 78.1 |

Since the measurements, in particular those conducted on thin fabrics, are influenced by the backing, the backings used were white and black backings. Four measurements were always taken on each of the test pieces. The measured degrees of brightness are relative values.

The measurements show that the CMS according to the invention is substantially superior to the conventional CMS, and, to a certain degree, even superior to the CMC which is most commonly used as soil suspension agent.

EXAMPLE 4

Washing tests were also conducted, using the washing preparations A, B and C, on polyester/cotton fabric (65:35).

In order to conduct the test, the textile fabric was subjected to deposition or rust, in accordance with the deposition method recommended by the washing establishments research institute Krefeld (Zeitschrift f. ges. Textilindustrie, 70, 12 1968, WTC 1969) always with 10 mg. rust (Dogussa 100) per cycle, in all 20 wash loads at 60° and 90° C. respectively.

Concentration of washing agent — 5 g./l.
Washing liquor ratio — 1:20.
Washing procedure — Linitest device, 15' to 90° or 60°; 10' at 90° or 60°.
Rinse — 3 times with distilled water.
Drying — Spin drying and dry ironing between filter paper.

Results of the washing tests

The effectivity of the soil suspending agent was determined after 20 washing operations, based on measurements of the degree of brightness (Elrepho/Zeiss), (Filter R 46+FL 46). The backing used was a black-standard backing.

The following table shows the results of the measurements of the degree of brightness after 20 washing operations:

| | | 60° C. | 90° C |
|---|---|---|---|
| Washing operations | 0 | 20 | 20 |
| Original degree of brightness | 84.4 | | |
| Without soil suspension agent | | 57.3 | 62.2 |
| A—(CMC) | | 56.4 | 66.2 |
| B—(conventional CMS) | | 58.8 | 64.4 |
| C—(CMS according to the invention) | | 61.2 | 67.4 |

The given values are average values of eight measurements.

It can be concluded from a comparison of Examples 3 and 4 that the CMS according to the invention is particularly suitable for use in detergents for washing polyester/cotton mixed fabrics, which, as well known, tend towards increased greying during the washing operations.

EXAMPLE 5

Test strips made of Krefeld cotton standard fabric were washed 50 times with a usually solid household laundry in a fully automatic washer (Bosch V 560). The washer used was of a full wash intermediate type, which has been produced in accordance with a tower spraying method, with different contents of soil suspension agents.

A = without soil suspension agents
B = with 1% of CMC
C = with 1.5% of CMC
D = with 1% of CMS according to the invention
E = with 1.5% of CMS according to the invention The test strips were measured after 50 washes each in a fourfold layer on a black background by an Elrepho measuring device using filter RE 46+FL 46.

The obtained remission values (R-value) are summarized in the following table:

A ............................................. 81.3
B ............................................. 81.2
C ............................................. 81.2
D ............................................. 82.2
E ............................................. 83.5

These values also show that if CMS is used as a soil suspension agent, more advantageous results are obtained even for use with household laundry as compared to comparable detergents based on the soil suspension agent CMC.

What is claimed is:

1. A detergent composition consisting essentially of an alkyl benzene sulfonate, at least one builder and a soil suspending agent, wherein said soil suspending agent consists of at least 0.5% by weight of carboxymethyl starch having a substitution degree of between 0.05 and 0.5 prepared by reacting starch with an alkali and an alkaline salt of chloroacetic acid at a temperature of 60–100° C. in an alcoholic medium containing 5–15% water in said medium taken in an amount such that the reaction mixture remains in powder-like condition during the reaction.

2. A detergent composition consisting essentially of an alkyl benzene sulfonate, and at least one phosphate builder, and wherein up to 50% of the phosphate builder has been replaced with carboxymethyl starch having a degree of substitution between 0.05 and 0.5 prepared by reacting starch with an alkali and an alkaline salt of chloroacetic acid at a temperature of 60–100° C. in an alcoholic medium containing 5–15% water said medium taken in an amount such that the reaction mixture remains in powder-like condition during the reaction.

3. A detergent composition according to claim 1 wherein the reaction was carried out in methanol.

4. A detergent composition according to claim 1 wherein the carboxymethyl starch has a degree of substitution of 0.05–0.2.

References Cited
UNITED STATES PATENTS

| 2,847,385 | 8/1958 | Hiler | 252—Dig 15 |
|---|---|---|---|
| 2,588,463 | 3/1952 | Balassa | 260—233.3 |
| 2,599,620 | 6/1952 | Filbert | 260—233.3 |
| 3,596,766 | 8/1971 | Johnston et al. | 260—233.3 |
| 3,629,121 | 12/1971 | Eldib | 252—89 |
| 3,655,436 | 4/1972 | Dupre | 260—233.3 |

WILLIAM E. SCHULZ, Primary Examiner

U.S. Cl. X.R.

252—Digest 15